(12) United States Patent
Muninder

(10) Patent No.: US 9,508,155 B2
(45) Date of Patent: Nov. 29, 2016

(54) METHOD AND APPARATUS FOR FEATURE COMPUTATION AND OBJECT DETECTION UTILIZING TEMPORAL REDUNDANCY BETWEEN VIDEO FRAMES

(75) Inventor: Veldandi Muninder, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 16 days.

(21) Appl. No.: 14/238,814

(22) PCT Filed: Aug. 2, 2012

(86) PCT No.: PCT/FI2012/050760
§ 371 (c)(1),
(2), (4) Date: Apr. 16, 2014

(87) PCT Pub. No.: WO2013/030435
PCT Pub. Date: Mar. 7, 2013

(65) Prior Publication Data
US 2015/0043785 A1 Feb. 12, 2015

(30) Foreign Application Priority Data
Aug. 29, 2011 (IN) .......................... 2947/CHE/2011

(51) Int. Cl.
*G06T 7/20* (2006.01)
*G06K 9/00* (2006.01)
*G06K 9/46* (2006.01)

(52) U.S. Cl.
CPC ......... *G06T 7/2033* (2013.01); *G06K 9/00228* (2013.01); *G06K 9/00261* (2013.01);
(Continued)

(58) Field of Classification Search
None
See application file for complete search history.

(56) References Cited

U.S. PATENT DOCUMENTS 6,130,912 A * 10/2000 Chang et al. ............ 375/240.16
6,633,655 B1   10/2003 Hong et al.
(Continued)

FOREIGN PATENT DOCUMENTS

| CN | 102103694 | 8/2011 |
| EP | 2256666 A2 | 12/2010 |
| WO | 99/51022 A1 | 10/1999 |
| WO | 2011/080599 A1 | 7/2011 |

OTHER PUBLICATIONS

Zhong, D., and S-F. Chang. "Video object model and segmentation for content-based video indexing." Circuits and Systems, 1997. ISCAS'97., Proceedings of 1997 IEEE International Symposium on. vol. 2. IEEE, 1997.*
translation of the CN 2012800419480 (foreign filed family application) Office Action.*
translation of the CN102103694 that is cited in the latest IDS.*
(Continued)

*Primary Examiner* — Aaron W Carter
*Assistant Examiner* — Narek Zohrabyan
(74) *Attorney, Agent, or Firm* — Alston & Bird LLP

(57) ABSTRACT

A method, apparatus and computer program product are provided for determining spatial location for one or more facial features. A method computes features for an initial frame. The computed features of the initial frame generate a feature image. A method also determines whether a translation is verified between the initial frame and an intermediate frame, wherein a translation is verified in an instance in which a distance used to verify the translation between the initial frame and the intermediate frame is within a predetermined threshold level. A method also includes a face search, using a portion of the feature image, for one or more facial features, wherein the portion of the feature image searched is a fraction of the total number of frames analyzed in a feature computation cycle. A method also determines a spatial location for the one or more facial features detected in the intermediate frame.

17 Claims, 4 Drawing Sheets

(52) U.S. Cl.
CPC ....... *G06K 9/00268* (2013.01); *G06K 9/00604* (2013.01); *G06K 9/4647* (2013.01); *G06T 2207/10016* (2013.01); *G06T 2207/20021* (2013.01); *G06T 2207/20076* (2013.01); *G06T 2207/30201* (2013.01); *G06T 2207/30241* (2013.01)

(56) References Cited

U.S. PATENT DOCUMENTS

| | | | |
|---|---|---|---|
| 6,711,587 B1 * | 3/2004 | Dufaux | |
| 7,391,907 B1 | 6/2008 | Venetianer et al. | |
| 7,636,454 B2 | 12/2009 | Lee et al. | |
| 8,098,885 B2 | 1/2012 | Zhang et al. | |
| 2005/0025342 A1 * | 2/2005 | Lee | G06T 7/2006 382/107 |
| 2006/0072664 A1 * | 4/2006 | Kwon | G09G 3/20 375/240.16 |
| 2009/0245580 A1 | 10/2009 | Greig | |
| 2010/0104266 A1 * | 4/2010 | Yashiro et al. | 386/122 |
| 2010/0157089 A1 | 6/2010 | Pakulski et al. | |

OTHER PUBLICATIONS

Arnaud et al., "A Robust and Automatic Face Tracker Dedicated to Broadcast Videos", IEEE International Conference on Image Processing, vol. 3, Sep. 11-14, 2005, 4 pages.

Mateos, "Refining Face Tracking With Integral Projections", Proceedings of the 4th international conference on Audio- and video-based biometric person authentication, vol. 2688, 2003, 8 pages.

Adams et al., "Viewfinder Alignment", In proceedings of Eurographics, vol. 27, No. 2, 2008, 10 pages.

Extended European Search Report received for corresponding European Patent Application No. 12827484.2, dated Jun. 29, 2015, 10 pages.

International Search Report and Written Opinion received for corresponding Patent Cooperation Treaty Application No. PCT/FI2012/050760, dated Dec. 10, 2012, 15 pages.

Vranceanu et al., "Robust Detection and Tracking of Salient Face Features in Color Video Frames", 10th International Symposium on Signals, Circuits and Systems (ISSCS), Published Jun. 30, 2011, 4 pages.

Puglisi et al., "Fast Block Based Local Motion Estimation for Video Stabilization", IEEE Computer Society Conference on Computer Vision and Pattern Recognition Workshops (CVPRW), Published Jun. 20, 2011, 8 pages.

Office Action for corresponding Chinese Application No. 201280041948.0 dated Jun. 23, 2016.

* cited by examiner

FIG. 4

METHOD AND APPARATUS FOR FEATURE COMPUTATION AND OBJECT DETECTION UTILIZING TEMPORAL REDUNDANCY BETWEEN VIDEO FRAMES

RELATED APPLICATION

This application was originally filed as Patent Cooperation Treaty Application No. PCT/FI2012/050760 filed on Aug. 2, 2012 which claims priority benefit to Indian Patent Application No. 2947/CHE/2011, filed Aug. 29, 2011.

TECHNOLOGICAL FIELD

Example embodiments relate generally to feature computation and, more particularly, to feature computation utilizing temporal redundancy between video frames to reduce computational intensity.

BACKGROUND

In various image processing applications, it may be desirable to track an object, such as a feature (e.g., face, facial feature, etc.), between successive frames in a video. In order to track a feature from one frame to the next, each frame may be analyzed to determine the new location of the feature. However, analyzing each frame may be a computationally intensive process which may be a challenge, at least for those devices with limited computational resources, to perform in an efficient and timely manner.

Feature tracking may be computationally intensive for various reasons. For example, some feature tracking techniques analyze each entire frame or at least a relatively large portion of each frame. As such, it would be desirable to provide an improved technique for feature tracking between frames, such as frames of a video that provides accurate results with reduced computational requirements.

BRIEF SUMMARY

A method, apparatus and computer program product are provided in accordance with an example embodiment in order to provide an improved technique for feature computation and facial searching. In this regard, the method, apparatus and computer program product of example embodiment may provide for feature computation in a manner that reduces computational requirements while continuing to provide reliable and robust feature computation. Indeed, the method, apparatus and computer program product of one example embodiment may provide for computing features in an image frame by exploiting the amount of overlap across a plurality of image frames.

In an embodiment, a method computes features for an initial frame. The computed features of the initial frame generate a feature image. A method also determines whether a translation is verified between the initial frame and an intermediate frame, wherein a translation is verified in an instance in which a distance used to verify the translation between the initial frame and the intermediate frame is within a predetermined threshold level. A method also includes a face search, using a portion of the feature image, for one or more facial features, wherein the portion of the feature image searched is a fraction of the total number of frames analyzed in a feature computation cycle. A method also determines a spatial location for the one or more facial features detected in the intermediate frame.

In an embodiment, a method further determines the translation by determining a horizontal integral projection based on the horizontal gradients of the luminance plane for the initial frame and the intermediate frame. A method also determines a vertical integral projection based on the vertical gradients of the luminance plane for the initial frame and the intermediate frame. A method also determines the horizontal translation of the intermediate frame in a horizontal direction using the vertical integral projection. A method also determines the vertical translation of the intermediate frame using the horizontal integral projection.

In an embodiment, a method further continues through a feature computation cycle by searching a portion of the feature image at a final frame for the one or more facial features. A method also determines a spatial location for the one or more facial features located in the searched portion of the final frame. A method also identifies a next frame as the initial frame; wherein the next frame restarts the feature computation cycle.

In another embodiment, an apparatus comprising a processor and a memory including software, the memory and the software configured to, with the processor, cause the apparatus to at least to compute features for an initial frame. The computed features of the initial frame generate a feature image. The apparatus is further caused to determine whether a translation is verified between the initial frame and an intermediate frame, wherein a translation is verified in an instance in which a distance used to verify the translation between the initial frame and the intermediate frame is within a predetermined threshold level. The apparatus is further caused to perform a face search using a portion of the feature image for one or more facial features, wherein the portion of the feature image searched is a fraction of the total number of frames analyzed in a feature computation cycle. The apparatus is further caused to determine a spatial location for the one or more facial features detected in the intermediate frame.

In a further embodiment, a computer program product comprising at least one computer readable non-transitory memory having program code stored thereon, the program code which when executed by an apparatus cause the apparatus at least to compute features for an initial frame. The computed features of the initial frame generate a feature image. A computer program product is further configured to determine whether a translation is verified between the initial frame and an intermediate frame, wherein a translation is verified in an instance in which a distance used to verify the translation between the initial frame and the intermediate frame is within a predetermined threshold level. A computer program product is further configured to perform a face search using a portion of the feature image for one or more facial features, wherein the portion of the feature image searched is a fraction of the total number of frames analyzed in a feature computation cycle. A computer program product is further configured to determine a spatial location for the one or more facial features detected in the intermediate frame.

In yet another embodiment, an apparatus is provided that includes means for computing features for an initial frame. The computed features of the initial frame generate a feature image. An apparatus further comprises means for determining whether a translation is verified between the initial frame and an intermediate frame, wherein a translation is verified in an instance in which a distance used to verify the translation between the initial frame and the intermediate frame is within a predetermined threshold level. An apparatus further comprises means for performing a face search, using a portion of the feature image, for one or more facial features, wherein the portion of the feature image searched is a fraction of the total number of frames analyzed in a feature computation cycle. An apparatus further comprises means for determining a spatial location for the one or more facial features detected in the intermediate frame.

BRIEF DESCRIPTION OF THE DRAWINGS

Figure 1:
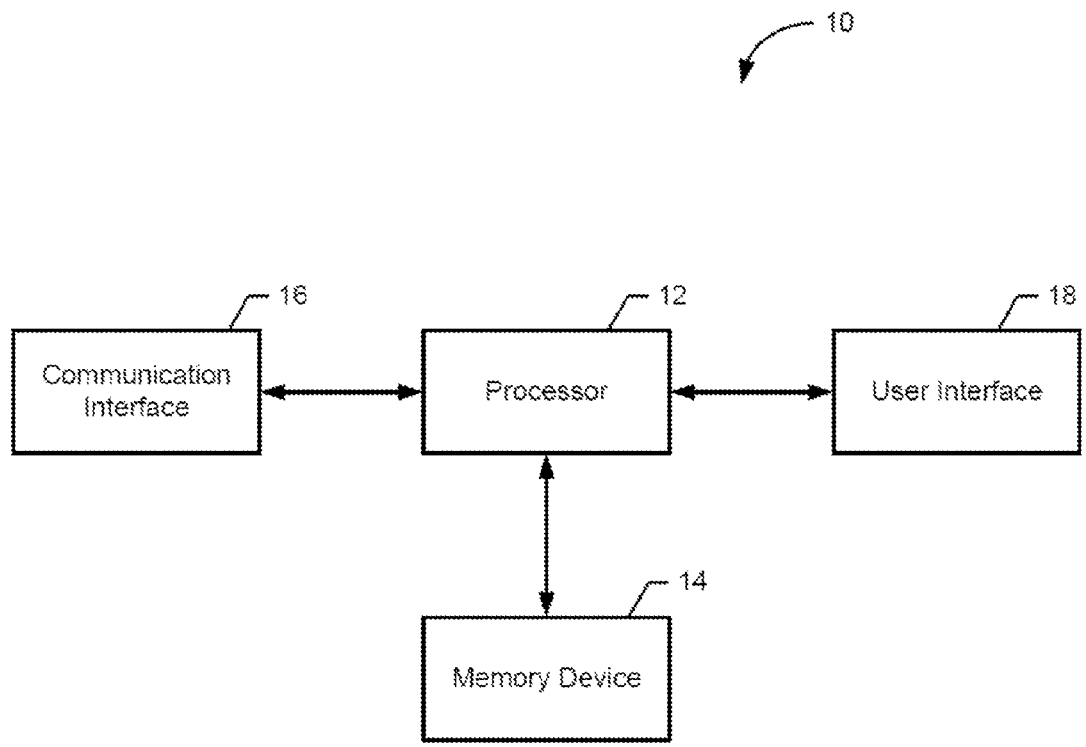
Figure 2:
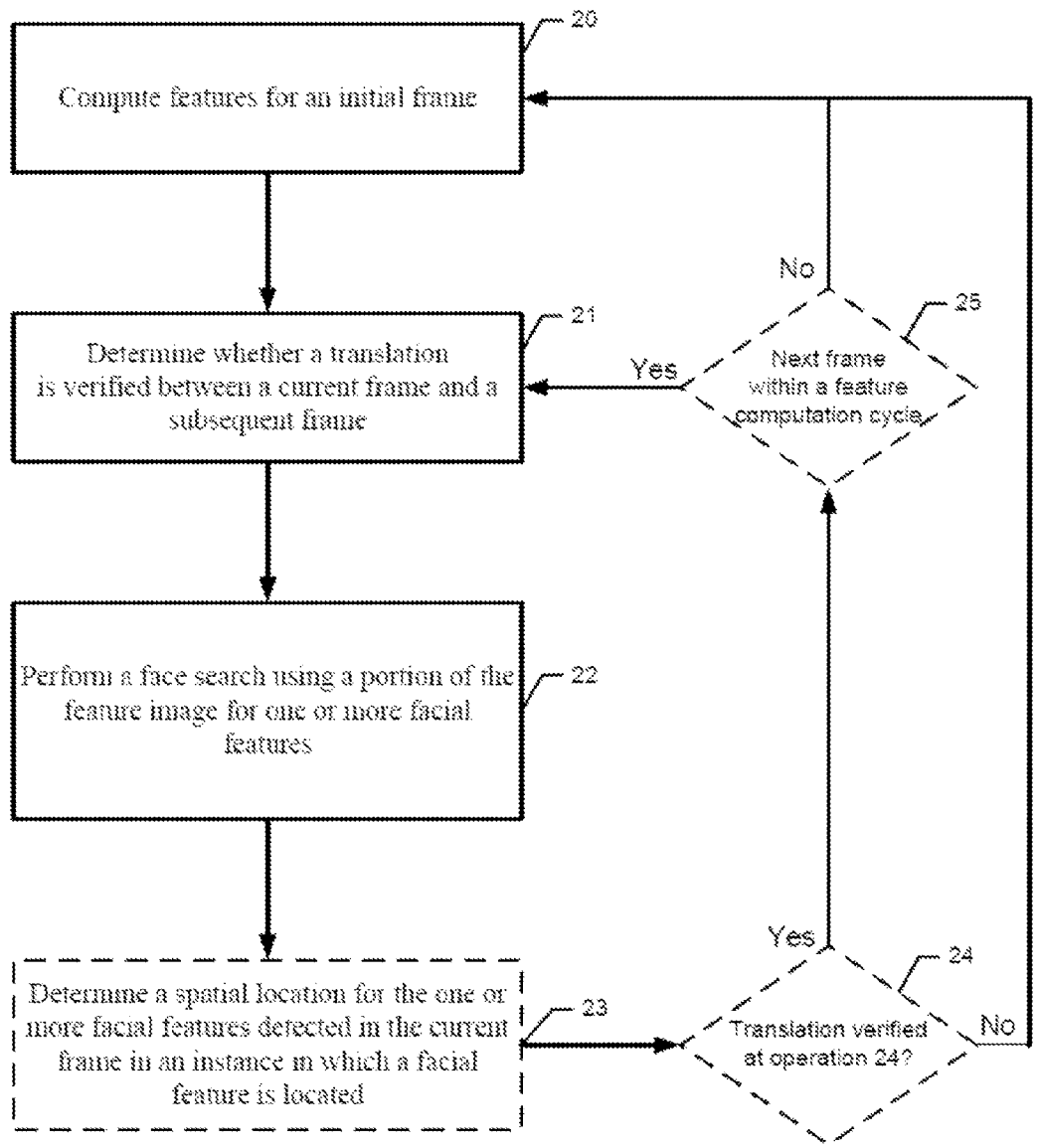
Figure 3:
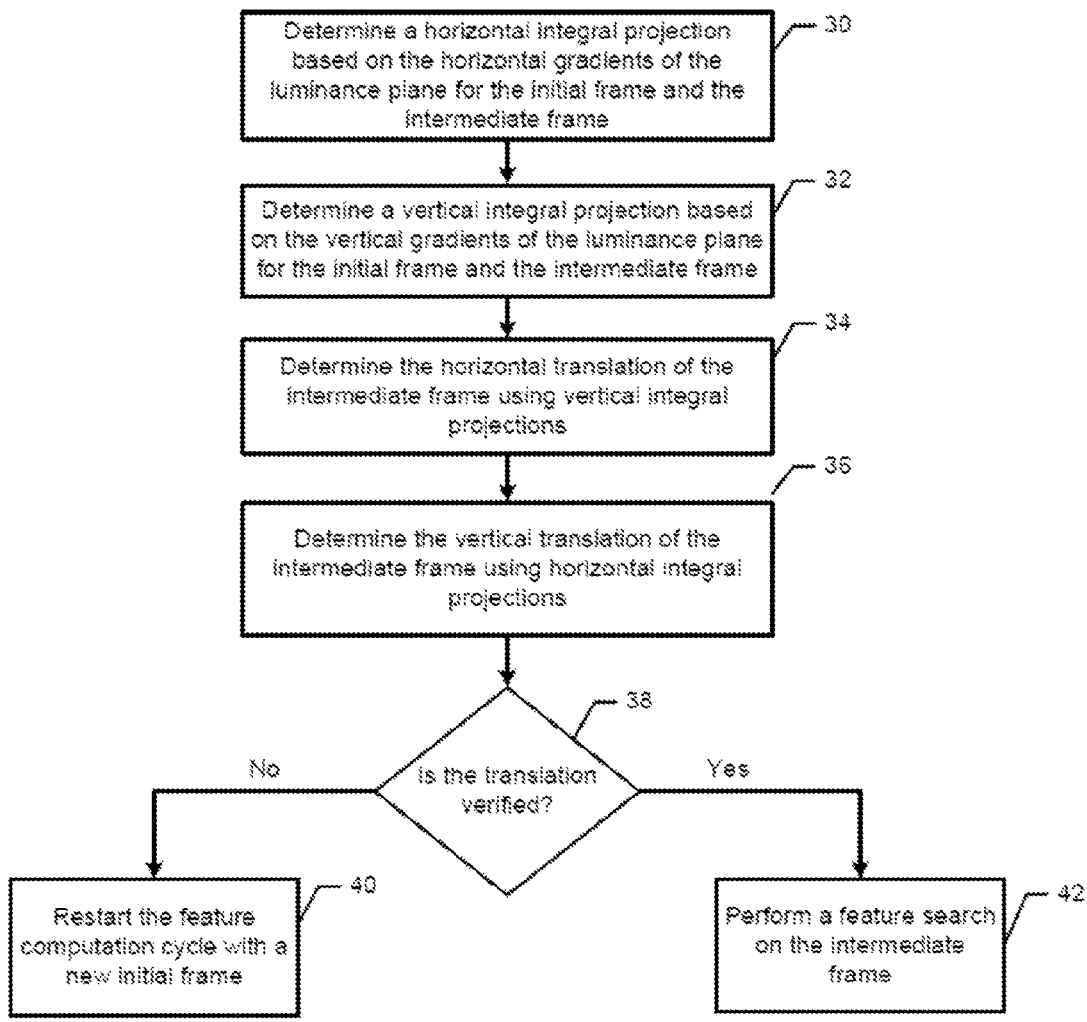

Having thus described certain example embodiments in general terms, reference will now be made to the accompanying drawings, which are not necessarily drawn to scale, and wherein:

FIG. 1 is a block diagram of an apparatus for performing feature computation in accordance with one example embodiment;

FIG. 2 is a flowchart illustrating a method for determining a location of a feature in accordance with one example embodiment;

FIG. 3 is a flowchart illustrating the operations performed in order to determine the translation between frames in accordance with another example embodiment; and FIG. 4 is a graphical representation of a partial frame search in accordance with one example embodiment.

DETAILED DESCRIPTION

Some example embodiments will now be described more fully hereinafter with reference to the accompanying drawings. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Examples of non-transitory computer-readable media include a floppy disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, a random access memory (RAM), a programmable read only memory (PROM), an erasable programmable read only memory (EPROM), a FLASH-EPROM, any other memory chip or cartridge, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

An apparatus 10 for performing feature computation including in accordance with one example embodiment of the present invention is shown in FIG. 1. The apparatus may be embodied in a wide variety of computing devices, such as mobile terminals, e.g., mobile telephones, mobile computers, personal digital assistants (PDAs), pagers, laptop computers, desktop computers, gaming devices, televisions and other types of mobile electronic systems, or various fixed computing devices, such as workstations, personal computers or the like. It should also be noted that while FIG. 1 illustrates one example of a configuration of an apparatus for performing facial search and feature computation, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 1, the apparatus 10 for performing feature computation is provided and may include or otherwise be in communication with a processor 12, a memory device 14, a communication interface 16 and a user interface 18. In some embodiments, the processor (and/or co-processors or any other processing circuitry assisting or otherwise associated with the processor) may be in communication with the memory device via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, applications, instructions or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 10 may, in some embodiments, be a mobile terminal or other computing device configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor 102 to perform the algorithms and/or operations described herein when the instructions are executed. However, in some cases, the processor may be a processor of a specific device (e.g., a mobile terminal or other computing device), such as processor of a mobile terminal, adapted for employing an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 16 may be any means such as a device or circuitry embodied in either hardware or a combination of hardware and software that is configured to receive and/or transmit data from/to a network and/or any other device or module in communication with the apparatus 10. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The user interface 18 may be in communication with the processor 12 to receive an indication of a user input at the user interface and/or to cause provision of an audible, visual, mechanical or other output to the user. As such, the user interface 18 may include, for example, a keyboard, a mouse, a joystick, a display, a touch screen(s), touch areas, soft keys, a microphone, a speaker, or other input/output mechanisms. Alternatively or additionally, the processor may comprise user interface circuitry configured to control at least some functions of one or more elements of the user interface, such as, for example, a speaker, ringer, microphone, display, and/or the like. The processor and/or user interface circuitry comprising the processor may be configured to control one or more functions of one or more elements of the user interface through computer program instructions (e.g., software and/or firmware) stored on a memory accessible to the processor (e.g., memory device 14, and/or the like).

With reference to FIG. 2, a method for determining a location of a feature according to an embodiment of a feature computation cycle is shown. The feature computation cycle consists of n frames. In an example embodiment, after n frames the feature computation is restarted and performed on a next frame to avoid accumulation of translation error. Hence, feature computation is done once in an initial frame and face search is conducted on a portion of the computed features from the initial frame. Therefore, 1/n of the computed features is searched for the n frames and therefore the face search complexity is distributed across n frames. The value of n can be tuned to achieve a tradeoff between computational complexity and faster feature detection. A lower value of n may provide faster object/face detection but may not gain much complexity reduction advantage. A high value of n may result in a slower object/face detection (in a maximum of n frames, an object is detected) but may gain complexity reduction advantage. The number of total frames n may vary and is generally based on at least one of a user selection, a number of frames before the translation exceeds a predetermined threshold, a preset number of frames and/or the like.

At operation 20, the apparatus 10 may include means, such as the processor 12 or the like, for computing features for an initial frame. As described herein, the computed features for the initial frame may also be referred to as the feature image. An example feature detection method is configured to be trained on 20×20 input samples with local binary pattern ("LBP") based values of the pixels as its features. The LBP values may be computed on a 20 pixel×20 pixel input sample to provide a 18×18 LBP sample image. Alternatively or additionally other image sizes may be used with embodiments of the current invention. For the input samples of size 20×20, LBP images are computed and a LBP value histogram is obtained for each input sample (among 18×18 possible co-ordinate locations in LBP image) and a coordinate may be selected as a weak classifier. The object/face detection method is configured to take an LPB window as input and classify it. To detect an object/face in an image, the LBP values are computed for the whole image and each window is given to the LBP based classifier to decide whether a feature is present. For example, to perform the initial face detection process in video frames, LBP values are computed for every frame and every subwindow is scanned in raster order for positions and scales.

Using a feature detection method, such as the feature detection method described above, features are computed for the initial frame with respect to operation 20. The translation between a current frame and a next frame, such as for example the initial frame and subsequent, intermediate frames, may be determined. The initial, intermediate, and/or final frames as used herein may relate to a frame instant and/or the like. In this regard, the apparatus 10 may include means, such as the processor 12 or the like, for determining whether a translation is verified between the initial frame and an intermediate frame, wherein a translation is verified in an instance in which a distance used to verify the translation between the initial frame and the intermediate frame is within a predetermined threshold level. See operation 21 of FIG. 2.

The determination of the translation motion between two frames such as a current frame and a next frame and in particular between an initial and an intermediate frame is shown with respect to FIG. 3. Reference is now made to FIG. 3 and, in particular, to operations 30 and 32 of FIG. 3. In this regard, apparatus 10 may include means, such as the processor 12 or the like, for determining a horizontal integral projection based on the horizontal gradients of the luminance plane for an initial frame v1(x) and an intermediate frame v2(x) and for determining a vertical integral projection based on the vertical gradients of the luminance plane for the initial frame h1(x) and for the intermediate frame h2(x).

As is shown in operations 34 and 36 the apparatus 10 may also include means, such as processor 12 or the like, for determining the horizontal translation ($\Delta x$)) of the intermediate frame in a horizontal direction using correlation and sum of absolute differences "SAD" measure between the vertical integral projections v1(x) and v2(x); and for determining the vertical translation ($\Delta y$) of the intermediate frame using the correlation and SAD between the horizontal integral projection h1(x) and h2(x). For example, the horizontal and vertical translation may be determined as follows:

$$\Delta x = \arg\min_{\text{where } -W_{\text{off}} <= x <= W_{\text{off}}} x\{\Sigma_{i=[1,W]}|v1(i)-v1(x+i)|\}$$

$$\Delta y = \arg\min_{\text{where } -H_{\text{off}} <= x <= H_{\text{off}}} x\{\Sigma_{i=[1,H]}|h1(i)-h2(x+i)|\}$$

Where W and H are the width and height, respectively, of the video frame and $W_{\text{off}} = W/20$ and $H_{\text{off}} = H/20$ As is shown in operation 38 of FIG. 3, the apparatus 10 may also include means, such as processor 12 or the like, for determining if the translation between consecutive frames is verified successfully. In one embodiment, the translation is verified successfully if the minimum SAD distance between two curves is less than the predetermined threshold. Alternatively or additionally other methods for determining and verification of translation may be used, such as measurements that account for computational speed, accuracy and/or the like. Alternatively or additionally, the threshold value may be adjusted to account for similar factors.

Once the translation is verified successfully, a new initial image frame is analyzed and the feature computation cycle restarts at operation 20 in FIG. 2. If the calculated translation is verified successfully, then at operation 42, the current image frame is partially searched for features; the partial search of an image frame is further described with reference to operation 22 of FIG. 2.

Providing that the calculated translation between frames is verified successfully, as was described with reference to FIG. 3, then as shown in operation 22 of FIG. 2, the apparatus 10 may also include means, such as processor 12 or the like, for searching a portion of the feature image for the one or more facial features. In order to determine the portion of the feature image searched, a fraction is used based on the total number of frames analyzed in a feature computation cycle (1/n). In an example embodiment, for every frame, $1/n^{th}$ area of the image is searched for a face using all scales with a uniform finer step size (e.g., higher scales can be searched using the whole image area as searching for higher scales takes very less time). In an embodiment, a scale is the size of the image to be searched at any given time, for example searching each 10×10 area of an image. A scale may be defined by the size of a face and/or object in an image. Thus, a total of n frames may be considered for face search and the translation calculations between every two successive frames k−1 and k are computed where 1<=k<=n.

In an example embodiment, feature computation is computed for an initial frame and a partial facial search is performed for each subsequent frame within the feature computation cycle. The computed features from the initial frame are used for face detection and are distributed across the subsequent frames. For example, by reusing the features computed with respect to the initial frame, a partial search may be used across a total of n frames. Thus, the complete feature computation and complete face search for all scales, shifts and poses may be performed over n frames.

Alternatively or additionally, in each frame the entire area of the feature image may be searched using all scales with a coarse step size. In this embodiment, the starting point of the search grid varies such that all the pixel positions are searched in n frames. In a frame a subwindow is scanned with (shift in x direction) $\Delta x = n$ and $\Delta y = n$ and the scan starts/origins from pixel position (1, 1). In the next frame a subwindow is scanned with $\Delta x = n$ and $\Delta y = n$ but the scan starts/origins from pixel position (2, 2). Continuing this for n frames, most of the positions in the feature image are covered during the feature search. The number of scales to be searched can be distributed across n frames. For example and shown with respect to FIG. 4, the operation of block 24 provides for performing a face search using a portion of the feature image for one or more facial features, wherein the portion of the feature image searched is a fraction of the total number of frames analyzed in a feature computation cycle. Since the grid does not change and is only translated, the search complexity can be distributed among n frames to perform a full face search.

Using the search of operation 22, the apparatus 10 may also include means, such as processor 12 or the like, for determining a spatial location for the one or more facial features detected in the feature image as is shown in operation 23 of FIG. 2. If the face is found at any instant of search, then the actual location of that face in the frame k may be computed as follows:

Let (x,y) be the face location found at any instant while processing

Let $(\Delta x_i, \Delta y_i)$ be the translation computed between frames i and i−1 $(x_k, y_k)$ be the face position in frame k Then $$x_k = x + \sum_{i=1:k} \Delta x_i$$

$$y_k = y + \sum_{i=1:k} \Delta y_i$$

The method, apparatus and computer program product of the example embodiment of the present invention as described above in conjunction with FIGS. 2 and 3, for example, may be implemented on an apparatus, such as apparatus 10, which may also include means, such as processor 12 or the like for, in an example embodiment, for processing the first frame in a video. In this example, the first frame is optionally resized to a 320×240 size, prior to the computing and storage of the LBP values features. As explained with reference to FIG. 3, the vertical & horizontal projections of the current frame and next frame are computed. For example. v1(x), v2(x), h1(x), h2(x), may be determined, thereby enabling the translation between two frames Δx and Δy to be computed.

In an example implementation to detect a feature of size 80×80 (4 times the base size of 20×20) of an image of size W×H, which is provide for purposes of illustration but not of limitation, the image is resized by decimating the image to a (W/4×H/4) size. In the new resized window, every subwindow of size 20×20 may be selected with shifts $t_x$ and $t_y$ in x and y directions being fed to a face detector, such as the face detector described herein. A total of 10 face sizes starting from 200×200 and down to 20×20 are searched in every frame. In this example the scale (M) is M=10. In one embodiment, starting with the larger scale 200×200, the image is resized accordingly and a LBP image is computed. Using this LBP image a face search may be performed. After every face search in one scale, the scale factor is reduced by a factor, such as by a factor of 1.25, and the face search may be performed until the minimum scale size, such as a scale size of 20×20. In an embodiment, this type of face detection will be able to detect faces ranging from 20×20 size to 200×200 size in a 320×240 image.

In general and according to and example embodiment for feature detection, to detect a feature of size S=t*20, where 20<=S<min(W, H), the input image may be resized by skipping pixels (W/t, H/t) and for every subwindow of size 20×20 with shift x and Y in the x and y directions is given as input to the feature detection apparatus and method as described herein. Thus each subwindow is searched in a first intermediate frame starting at a first pixel location and in a subwindow in a second intermediate frame starting with a second pixel location. As described herein, the second pixel location is offset from the first pixel using the determined translation.

At decision block 24, the apparatus 10 may also include means, such as processor 12 or the like, for determining if the translation was verified with respect to Operation 21. If not, as described herein, the feature computation cycle restarts with computing the features for an initial frame as shown with respect to Operation 20. If the translation is verified, then at decision block 25, the apparatus 10 may also include means, such as processor 12 or the like, for determining if a next frame, such as a next intermediate frame, is within n frames of the feature computation cycle as described herein. If the next frame is within n frames of the feature computation cycle, then the next frame becomes the current frame and the method restarts with Operation 21. If the next frame is not within n frames of the feature computation cycle then the method restarts with computing the features for an initial frame as shown with respect to Operation 20.

Figure 4:
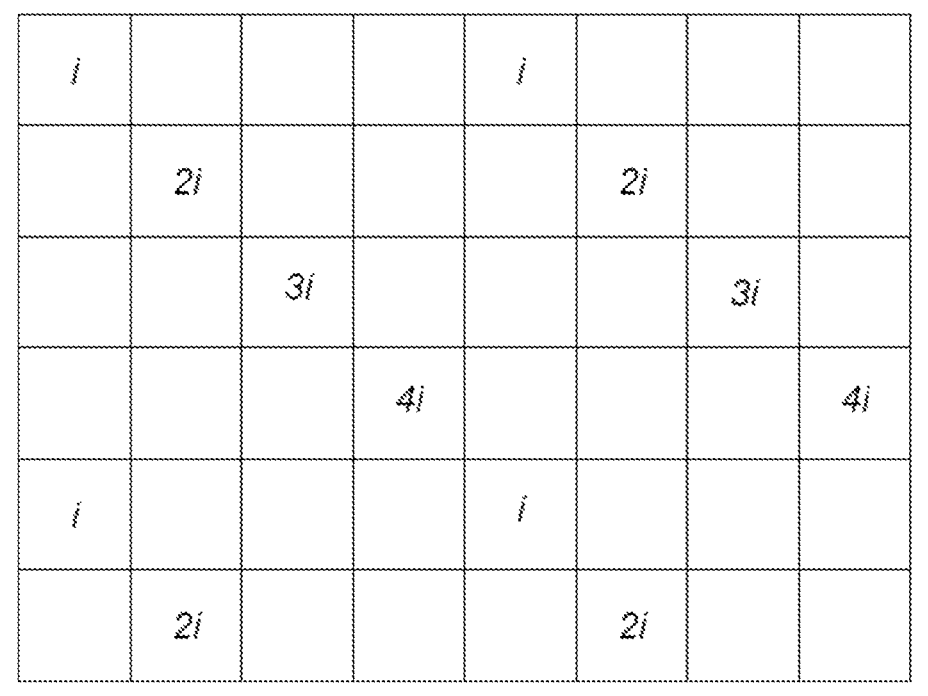

FIG. 4 is a graphical representation of a partial facial search of a feature image in accordance with one example embodiment of the present invention. In a first intermediate frame (i−1), starting from location (1, 1) each subwindow with shift $t_x$ and $t_y$ in x and y directions is given as input to the feature detection apparatus and method as described herein. Here $t_x=4$ and $t_y=4$ In a second intermediate frame, using the feature-image, (i=2), starting from location (2, 2), every subwindow with shift $t_x$ and $t_y$ in x and y directions is given as input to the classifier. Here $t_x=4$ and $t_y=4$. This is continued for n frames where n=4 in the current implementation, and at every $i^{th}$ frame, the starting position of scan is (i,i) and $t_x=4$ and $t_y=4$. If the face is found at any instant at location (x,y) in the feature-image, the face location in the current frame (k) is computed using:

$$x_k = x + \sum_{i=1:k} \Delta x_i;$$

$$y_k = y + \sum_{i=1:k} \Delta y_i;$$

As described above, FIGS. 2-3 are flowcharts of a method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 14 of an apparatus 10 and executed by a processor 12 of the apparatus 10. As will be appreciated, any such computer program instructions may be loaded onto a computer or other programmable apparatus (e.g., hardware) to produce a machine, such that the instructions which execute on the computer or other programmable apparatus create means for implementing the functions specified in the flowcharts' blocks. These computer program instructions may also be stored in a non-transitory computer-readable memory that may direct a computer or other programmable apparatus to function in a particular manner, such that the instructions stored in the computer-readable memory produce an article of manufacture which implements the functions specified in the flowcharts' blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts' blocks.

Accordingly, blocks of the flowcharts of FIGS. 2-3 support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

As described herein, a method, apparatus and computer program product are provided in accordance with an example embodiment of the present invention in order to provide an improved technique for feature computation. In this regard, the method, apparatus and computer program product of one embodiment may provide for feature computation in a manner that reduces computational requirements while continuing to provide reliable and robust feature computation. Indeed, the method, apparatus and computer program product of one example embodiment may provide for computing features in an image frame by exploiting the amount of overlap across a plurality of image frames.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
computing features for an initial frame, wherein the computed features of the initial frame generate a feature image;
determining whether a translation is verified between the initial frame and an intermediate frame, wherein a translation is verified if a distance used to verify the translation between the initial frame and the intermediate frame is within a predetermined threshold level, and wherein determining whether the translation is verified comprises computing the translation using correlation and sum of absolute differences of a horizontal integral projection and a vertical integral projection;
performing a face search, using the computed features of the initial frame and a portion of the intermediate frame, for one or more facial features, wherein the portion of the intermediate frame searched is a fraction of the total number of frames analyzed in a feature computation cycle; and
determining a spatial location for the one or more facial features detected in the searched portion of the intermediate frame.

2. The method according to claim 1 wherein determining translation further comprises:
determining the horizontal integral projection based on the horizontal gradients of the luminance plane for the initial frame and the intermediate frame;
determining the vertical integral projection based on the vertical gradients of the luminance plane for the initial frame and the intermediate frame;
determining the horizontal translation of the intermediate frame in a horizontal direction using the vertical integral projection; and
determining the vertical translation of the intermediate frame using the horizontal integral projection.

3. The method according to claim 1 further comprising:
searching a portion of the feature image at a final frame for the one or more facial features;
determining a spatial location for the one or more facial features located in the searched portion of the final frame; and
providing a next frame as the initial frame; wherein the next frame restarts the feature computation cycle.

4. The method according to claim 1 further comprising analyzing each frame between subsequent to the initial frame and a final frame inclusive for translation and at least a portion of the feature image is searched for one or more facial features.

5. The method according to claim 1 further comprising determining the total number of frames analyzed by at least one of a user selection, a number of frames before the translation exceeds the predetermined threshold level, and a preset number of frames.

6. The method according to claim 1 further comprising determining the searched portion of the feature image by calculating 1/total number of frames analyzed during the feature computation cycle.

7. The method according to claim 1 wherein searching a portion of the intermediate frame for the one or more facial features further comprises:
searching a subwindow in the feature image at first intermediate frame starting at a first pixel location; and
searching a subwindow in the feature image at a second intermediate frame starting with a second pixel location, wherein the second pixel location is offset from the first pixel using the determined translation.

8. An apparatus comprising a processor and a memory including software, the memory and the software configured to, with the processor, cause the apparatus to at least:
compute features for an initial frame, wherein the computed features of the initial frame generate a feature image;
determine whether a translation is verified between the initial frame and an intermediate frame, wherein a translation is verified if a distance used to verify the translation between the initial frame and the intermediate frame is within a predetermined threshold level, and wherein the apparatus is caused to determine whether the translation is verified by computing the translation using correlation and sum of absolute differences of a horizontal integral projection and a vertical integral projection;
in an instance in which the determined translation is verified, perform a face search using the computed features of the initial frame and a portion of the intermediate frame for one or more facial features, wherein the portion of the intermediate frame searched is a fraction of the total number of frames analyzed in a feature computation cycle; and
determine a spatial location for the one or more facial features detected in the searched portion of the intermediate frame.

9. The apparatus according to claim 8 wherein the at least one memory including the computer program code is further configured to, with the at least one processor, cause the apparatus to:
  determine the horizontal integral projection based on the horizontal gradients of the luminance plane for the initial frame and the intermediate frame;
  determine the vertical integral projection based on the vertical gradients of the luminance plane for the initial frame and the intermediate frame;
  determine the vertical translation of the intermediate frame in a horizontal direction using the horizontal integral projection; and
  determine the horizontal translation of the intermediate frame using the vertical integral projection.

10. The apparatus according to claim 8 wherein each frame between subsequent to the initial frame and a final frame inclusive for translation and at least a portion of the feature image is searched for one or more facial features.

11. The apparatus according to claim 8 wherein the searched portion of the feature image by calculating 1/total number of frames analyzed during the feature computation cycle.

12. The apparatus according to claim 8 wherein the at least one memory including the computer program code is further configured to, with the at least one processor, cause the apparatus to:
  search a subwindow in the feature image at first intermediate frame starting at a first pixel location; and
  search a subwindow in the feature image at a second intermediate frame starting with a second pixel location, wherein the second pixel location is offset from the first pixel using the determined translation.

13. A non-transitory computer readable product with a computer program comprising program code, which when executed by an apparatus cause the apparatus at least to:
  compute features for an initial frame, wherein the computed features of the initial frame generate a feature image;
  determine whether a translation is verified between the initial frame and an intermediate frame, wherein a translation is verified in an instance in which a distance used to verify the translation between the initial frame and the intermediate frame is within a predetermined threshold level, and wherein the apparatus is caused to determine whether the translation is verified by computing the translation using correlation and sum of absolute differences of a horizontal integral projection and a vertical integral projection;
  perform a face search, using the computed features of the initial frame and portion of the intermediate frame, for one or more facial features, wherein the portion of the intermediate frame searched is a fraction of the total number of frames analyzed in a feature computation cycle; and
  determine a spatial location for the one or more facial features detected in the searched portion of the intermediate frame.

14. The non-transitory computer readable product with the computer program according to claim 13 further comprising program code instructions to:
  determine the horizontal integral projection for the initial frame and the intermediate frame based on the horizontal gradients of the luminance plane;
  determine the vertical integral projection for the initial frame and the intermediate frame based on the vertical gradients of the luminance plane;
  determine the vertical translation of the intermediate frame in a horizontal direction using the horizontal integral projection; and
  determine the horizontal translation of the intermediate frame using the vertical integral projection.

15. The non-transitory computer readable product with the computer program according to claim 13 further comprising program code instructions to analyze each frame between subsequent to the initial frame and a final frame inclusive for translation and at least a portion of the feature image is searched for one or more facial features.

16. The non-transitory computer readable product with the computer program according to claim 13 further comprising program code instructions to determine the searched portion of the feature image by calculating 1/total number of frames analyzed during the feature computation cycle.

17. The non-transitory computer readable product with the computer program according to claim 13 wherein searching a portion of the intermediate frame for the one or more facial features further comprising program code instructions to:
  search a subwindow in the feature image at first intermediate frame starting at a first pixel location; and
  search a subwindow in the feature image at a second intermediate frame starting with a second pixel location, wherein the second pixel location is offset from the first pixel using the determined translation.

* * * * *